Feb. 26, 1952  G. G. E. AUGEREAU  2,587,088
BUSH FOR BEARINGS

Filed July 25, 1945

INVENTOR:
GASTON G. E. AUGEREAU
By: Houltine, Lake & Co.
AGENTS

Feb. 26, 1952 G. G. E. AUGEREAU 2,587,088
BUSH FOR BEARINGS
Filed July 25, 1945 2 SHEETS—SHEET 2
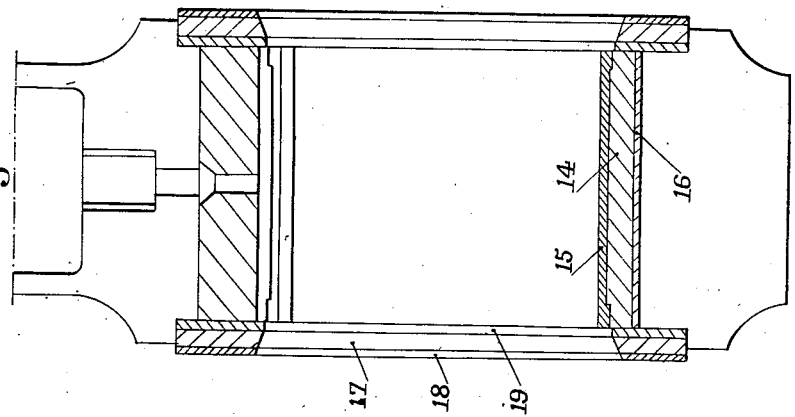
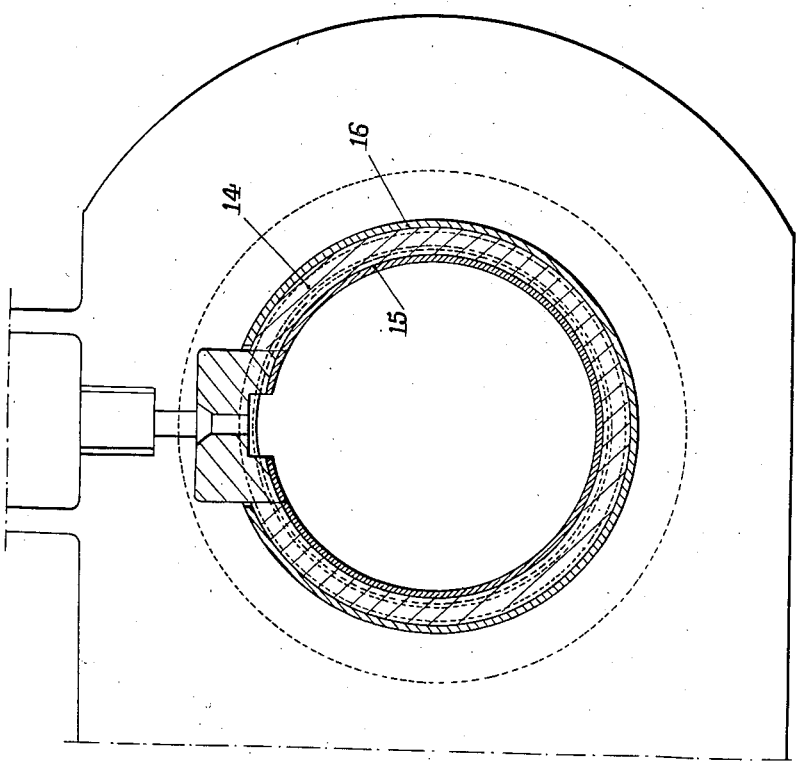
INVENTOR:
GASTON G.E. AUGEREAU
By: Haseltine, Lake & Co.
AGENTS Patented Feb. 26, 1952

2,587,088

UNITED STATES PATENT OFFICE 2,587,088

BUSH FOR BEARINGS

Gaston Georges Eugène Augereau, Paris, France

Application July 25, 1945, Serial No. 607,011
In France May 13, 1942

Section 1, Public Law 690, August 8, 1946
Patent expires May 13, 1962

6 Claims. (Cl. 308—53)

This invention relates to improvements in bushes for bearings and more particularly to bushes with normalized parts. The term "normalized" used herein is intended to indicate components which are made in conformity with established standards of measurement and tolerance.

An object of the present invention is to provide bearings particularly to be employed in connection with railway material, and more generally with all material for which, besides the compensation for the wear in service, the compensation of the variations of the diameter or of the bearing length of the shaft, due to the successive rectifying operations in view of repair to which such axles are submitted during their life, must be taken in consideration. The variation of diameter, for example, may come up to $\frac{1}{10}$ of said diameter and more.

Another object of the invention is to replace the use of bearings of conventional types by removable bushes with normalized parts particularly with normalized shell which may be set in place even after the rectification of the shaft.

Another object of the invention is to replace the use of bearings of conventional type by bushes with normalized part, particularly with normalized removable cheeks which can be set in place even after rectification of the shaft.

Another object of the invention is to provide bearings with shell type bushings in which the variations of the diameter of the shaft may be compensated by a shim or liner inserted between the housing and the shell and in which the variations of the bearing length may be compensated by shims or liners inserted between the cheeks and the casing of the same.

It is already known to insert a thin liner between the shell and the housing in view of compensation of the wear in service. But the bushes of conventional type do not allow to insert a shim, the thickness of which being sufficient to compensate the variations of diameter of the axle due to successive repairs.

Another object of this invention is to provide a bearing with shell type bushing in which a normalized shell may be easily set in place, expanded and locked or removed by means of a tapered key, even after a rectification of the shaft and in such case only by insertion of a shim between the shell and the housing and adjustment of the width of the key.

Features resulting from the attainment of these objectives include the provision of bearings in which a special form of key provides the retention and locking in place of the normalized shell even after rectification of the shaft, the provision of a shim adapted to be inserted between the shell and the housing for compensation of the variation of diameter of the axle, the provision of removable cheeks and of shims or liners adapted to be inserted between the cheeks and the casing of the same for compensation of the variation of the bearing length of the shaft.

The invention may be applied as well with split cylindrical shells as with substantially semicylindrical shells or the like.

In the accompanying drawing which shows as an example of realization of this invention: the application of said invention to a locomotive bearing:

Fig. 7 is a transverse sectional view showing an embodiment of the invention applied to a solid stub; and Fig. 8 is an axial sectional view of the embodiment of Fig. 7.

Figure 1:
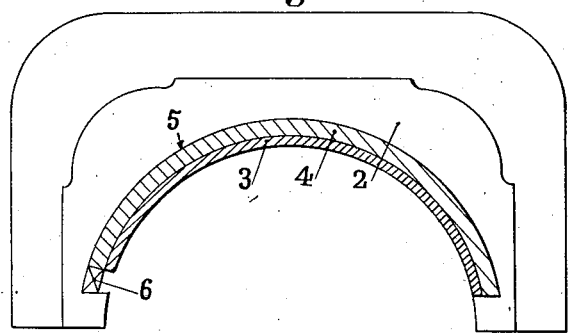
Fig. 1 is a transverse sectional view of a bearing constructed according to the present invention, and illustrating the arrangement of the parts before any wearing of the corresponding journal or crank has taken place.

According to this invention, a thin sheet 3 of babbitt lining is arranged upon the conveniently metallic shell 4 (Fig. 1) which is kept in the usual casing 5 provided in the bore of the bush 2 for receiving the Babbitt metal, which prior to this invention had been arranged in a rather thick lining. Said shell 4 is to be kept in its convenient position preferably by means of a longitudinally tapered pin or key 6 which is to be brought into position by means of a hammer, or of a press or in any other way.

Said key secures by means of an elastic distortion of the shell the precise adherence of same in its casing which is for instance, the body of an oil case, the head of a connecting rod, etc., thus favouring the elimination of heat.

The shells 4 and cheeks 8 being normalized are systematically manufactured always at the same dimensions and afterwards provided with their thin sheets of babbitt 3 and 9. They are consequently exactly identical and are provided with all the advantages of a normalized construction.

The shells are simply approximately brought to the desired shape according in each case to the diameter of the corresponding crank. The tapered key, according to the present invention, is so constructed that the modification of the width of said key may compensate the variation of the circumferential length of the bearing surface. Preferably, the form of the key is such that it has inner and outer radii conforming to those of the shell itself. With such a form, the adjustment of the key is a very simple and economical operation. Said shells are then provided, on one or on both faces 7 of the bush or bearing with a cheek 8 which is also provided on its external face with a thin sheet 9 of Babbitt metal.

Figure 2:
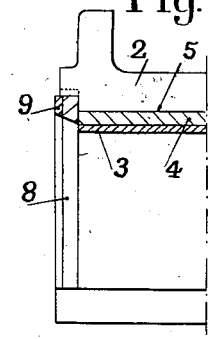
Fig. 2 is longitudinal, axial sectional view of the bearing of Fig. 1.
Figure 5:
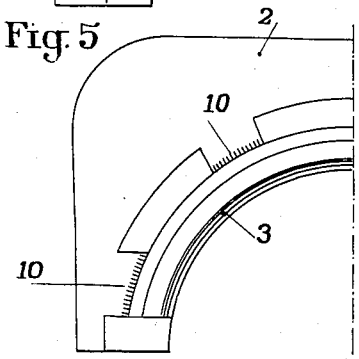
Fig. 5 is a partial end view of the bearing in Figs. 3 and 4.
Figure 6:
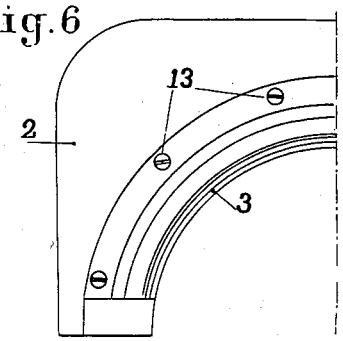
Fig. 6 is a view similar to Fig. 5, but showing another embodiment of the invention.

Every cheek 8 bears as shown in Fig. 2 on the corresponding end of shell 4 which is thus locked between both cheeks, each of such cheeks being itself locked as shown in Fig. 5 by a convenient soldering 10 or by means of screws 13 as in Fig. 6, the heads of which are conveniently in line with the surface of the shell.

Figure 3:
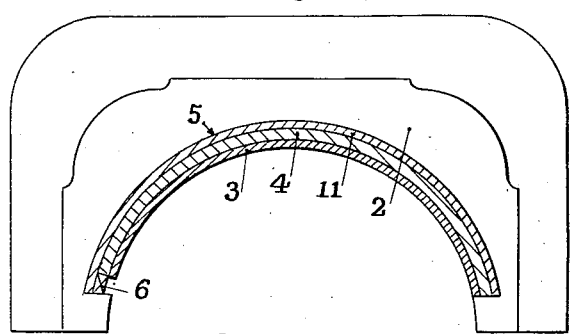
Figs. 3 and 4 are views similar to Figs. 1 and 2, respectively, but showing the arrangement of the bearing after compensation has been made for wearing of the corresponding journal or crank.
Figure 4:
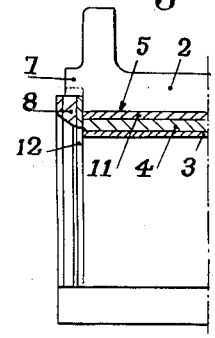

Thanks to the described arrangement, when a wear of crank, axle or journal takes place, the change of dimension thus produced is compensated by inserting between every shell 4 and the bottom of the corresponding casing 5 of bearing 2 a liner 11 (Figs. 3 and 4) the width of which is exactly the same as the radial wear of the crank. For the cheeks, a liner 12 (Fig. 4) is located between the metallic cheek 8 and casing of same, said liner having exactly a thickness equal to the lateral wear of the corresponding side of the bearing.

Figs. 7 and 8 show the application of the invention to the case of a ring brass, the bearing being shown in 14 and the covering being shown in 15 and the liner in 16, the cheeks are shown by 17, their covering by 18 and the liner by 19.

Any convenient metal could be used for the construction of shells 4, cheeks 8 and parts designed for compensating the wear though said parts being preferably made of steel. The lining may also be constituted by antifriction metal or any convenient metal.

The invention is to be applied to the bushes and bearings of any kind or for any use.

What I claim is:

1. In a bearing having a shell-type bushing; the combination with the bearing box of a thin, deformable split shell formed of a portion of a cylinder; and of a longitudinally tapered key having a cross-sectional shape of a segment of a cylinder having inner and outer radii conforming to that of said shell; said key being so positioned and engaging said shell as to expand the latter in the box.

2. In a bearing having a bearing box and a shell-type bushing and separate removable cheeks; the combination with the bearing box and the cheeks of a thin, deformable split shell formed of a circumferential portion of a cylinder; of a longitudinally tapered key having a cross-sectional shape of a segment of a cylinder having inner and outer radii equal to those of said shell; and of separate removable shims disposed between said shell and the box and between said cheeks and the box.

3. In a bearing having a shell-type bushing; the combination with the bearing box of a thin, deformable split shell formed of a circumferential portion of a cylinder; of a longitudinally tapered key having a cross-section shape of a segment of a cylinder having inner and outer radii equal to the inner and outer radii of said shell; and of a separate, removable shim between said shell and the box.

4. In a bearing having a shell-type bushing; the combination with the bearing box of a thin, deformable split shell formed of a circumferential portion of a cylinder; of a longitudinally tapered key wedging said shell in the bearing box; said key being formed with a cross-sectional shape of a segment of a cylinder having inner and outer radii equal to those of said shell, and with radially disposed side edges; and of a separate, removable shim between said shell and the bearing box.

5. The method of compensating substantial variations in the diameter of a shaft journalled in a bearing which comprises supporting the shaft in a thin, deformable split shell formed of a circumferential portion of a cylinder of standard size; inserting between the shell and the bearing box a shim of a thickness selected from a series of such shims increasing in thickness by increments equal to the difference between the maximum and minimum clearances desired between said shaft and said shell; and expanding the shell to fit closely around said shaft by inserting in the split of said shell a longitudinally tapered key having a cross-sectional shape of a segment of a cylinder having inner and outer radii equal to those of said shell.

6. The method of compensating substantial variations in the diameter of a shaft journalled in a bearing having a bearing box and removable cheeks of a standard size which comprises supporting the shaft in a thin, deformable split shell formed of a circumferential portion of a cylinder of standard size; inserting between the shell and the bearing box and between the removable cheeks and the bearing box shims of a thickness selected from a series of such shims increasing in thickness by increments equal to the difference between the maximum and minimum clearances desired between said shaft and the shell and between said shaft and said cheeks; and expanding said shell to fit closely around said shaft by inserting in the split of said shell a longitudinally tapered key formed with a cross-sectional shape of a segment of a cylinder having inner and outer radii equal to those of said shell.

GASTON GEORGES EUGÈNE AUGEREAU.

REFERENCES CITED

The following references are of record in the file of this patent:

UNITED STATES PATENTS

| Number | Name | Date |
|---|---|---|
| 864,663 | Marker | Aug. 27, 1907 |
| 1,656,125 | Neuenfelt | Jan. 10, 1928 |
| 1,719,436 | McWhirter | July 2, 1929 |
| 1,746,129 | Robinson | Feb. 2, 1930 |
| 2,161,559 | Cooke | June 6, 1939 |
| 2,316,119 | Bagley, Jr. | Apr. 6, 1943 |

FOREIGN PATENTS

| Number | Country | Date |
|---|---|---|
| 104,056 | Austria | Sept. 10, 1926 |
| 885,825 | France | Sept. 27, 1943 |